United States Patent
Grant

(10) Patent No.: US 9,948,078 B2
(45) Date of Patent: Apr. 17, 2018

(54) ELECTRICAL CONDUIT BODY WITH WIRING CHAMBER

(71) Applicant: ALPIN MANAGEMENT PARTNERS LTD., Houston, TX (US)

(72) Inventor: Andrew J. Grant, Houston, TX (US)

(73) Assignee: ALPIN MANAGEMENT PARTNERS LTD., Houston, TX (US)

( * ) Notice: Subject to any disclaimer, the term of this patent is extended or adjusted under 35 U.S.C. 154(b) by 176 days.

(21) Appl. No.: 14/986,102

(22) Filed: Dec. 31, 2015

(65) Prior Publication Data
US 2016/0261098 A1 Sep. 8, 2016

Related U.S. Application Data

(60) Provisional application No. 62/129,635, filed on Mar. 6, 2015.

(51) Int. Cl.
*H02G 3/06* (2006.01)
*H02G 3/08* (2006.01)

(52) U.S. Cl.
CPC .............. *H02G 3/081* (2013.01); *H02G 3/06* (2013.01)

(58) Field of Classification Search
None
See application file for complete search history.

(56) References Cited

U.S. PATENT DOCUMENTS

| | | | | |
|---|---|---|---|---|
| 4,896,784 A * | 1/1990 | Heath | ...................... | H02G 3/14 174/53 |
| 4,936,478 A * | 6/1990 | Bozdeck | ................. | G09F 13/04 174/657 |
| 5,939,675 A * | 8/1999 | DeFreitas | .............. | H02G 3/085 174/669 |
| 7,109,416 B1 * | 9/2006 | Reed | ..................... | H02G 15/113 174/481 |
| 8,376,411 B2 * | 2/2013 | Newby | .................. | F16L 55/172 174/50 |
| 8,701,911 B2 * | 4/2014 | Youssef | ................. | H02G 3/121 174/481 |

(Continued)

FOREIGN PATENT DOCUMENTS

| EP | 0103414 A2 | 12/1983 |
|---|---|---|
| GB | 23944 | 0/1907 |

OTHER PUBLICATIONS

Killark Conduit Outlet Body, T, ½ In. OT-1; Zoro.com; obtained Oct. 31, 2016 at http://www.zoro.com/killark-conduit-outlet-body-t-12-in-ot-1/i/G319091/?gclid=Cj0KEQiA.

*Primary Examiner* — Britt D Hanley
(74) *Attorney, Agent, or Firm* — Mossman, Kumar & Tyler PC

(57) ABSTRACT

Methods, systems, and devices for use in an electrical conduit system, including a conduit body apparatus for use in an electrical conduit system comprising conduit tubular segments. The apparatus may include a conduit body defining: a plurality of ports each configured to receive an end of a conduit tubular segment; a passage between a first port of the plurality of ports and a second port of the plurality of ports allowing wiring to pass through the conduit body; and a wiring chamber communicating with the passage, the wiring chamber comprising an opening having a direction of entry substantially parallel to a direction of entry of at least one port of the plurality of ports.

3 Claims, 7 Drawing Sheets

(56) References Cited

U.S. PATENT DOCUMENTS

| | | | |
|---|---|---|---|
| 8,867,235 B2* | 10/2014 | Veillette | H02G 3/083 174/559 |
| 2003/0034649 A1* | 2/2003 | Gault | F16L 41/03 285/125.1 |
| 2006/0207783 A1* | 9/2006 | Lammens, Jr. | H02G 15/08 174/58 |
| 2009/0126988 A1* | 5/2009 | Pyron | H02G 3/0608 174/481 |

* cited by examiner

ELECTRICAL CONDUIT BODY WITH WIRING CHAMBER

CROSS-REFERENCES TO RELATED APPLICATIONS

This application claims priority from U.S. Provisional Application Ser. No.: 62/129,635, filed Mar. 6, 2015, the disclosure of which is incorporated herein by reference in its entirety.

FIELD OF THE DISCLOSURE

This disclosure pertains generally to electrical conduit systems.

BACKGROUND OF THE DISCLOSURE

Electrical conduit systems are used in many settings, but are particularly suited to industrial settings (e.g., manufacturing facilities, factories, refineries, offshore oil rigs). Commercial real estate setting, such as office buildings, may also use electrical conduit systems for safety. In many cases, building codes or other health and safety codes (e.g., the United States National Electrical Code) require their use. The system typically includes electrical conduit, comprising tubular which may be made of metal (e.g., steel or aluminum), plastic, composite and the like. The conduit houses the wiring of an electrical system as the wiring runs throughout an industrial facility or other location. The wiring may be a bundle of single conductors wherein each conductor is covered with an individual insulating barrier (i.e., dielectric barrier). One or more additional insulating layers may surround one or more bundles. The conduit system may be fluid-tight.

SUMMARY OF THE DISCLOSURE

In aspects, the present disclosure provides methods, systems, and devices for use in an electrical conduit system. Device embodiments include a conduit body apparatus for use in an electrical conduit system comprising conduit tubular segments. The apparatus may include a conduit body defining: a plurality of ports each configured to receive an end of a conduit tubular segment; a passage between a first port of the plurality of ports and a second port of the plurality of ports allowing wiring to pass through the conduit body; and a wiring chamber communicating with the passage, the wiring chamber comprising an opening having a direction of entry substantially parallel to a direction of entry of at least one port of the plurality of ports.

The plurality of ports may each comprise a respective central axis, wherein each respective central axis substantially lies in a common plane, and the opening does not intersect the common plane. The plurality of ports may include an additional port oriented substantially perpendicular to the passage; and wherein the direction of entry of the opening is substantially parallel to a direction of entry of the additional port. The direction of entry of the opening may comprise a first direction substantially transverse to the opening and away from the conduit body, and the direction of entry of the at least one port may comprise a second direction substantially transverse to the at least one port and away from the conduit body.

Additional conduit body apparatus embodiments may include a conduit body defining: a plurality of ports each configured to receive an end of a conduit tubular segment; a passage between a first port of the plurality of ports and a second port of the plurality of ports allowing wiring to pass through the conduit body; at least one additional port oriented substantially perpendicular to the passage; an adjoining passage connecting the at least one additional port to the passage; and a wiring chamber communicating with the passage, the wiring chamber comprising an opening having a direction of entry substantially parallel to a direction of entry of the at least one additional port; wherein direct entry into each of the plurality of ports does not intersect the wiring chamber.

System embodiments may include device described above and hereinbelow coupled with segments of electrical conduit tubular. Further electrical conduit system embodiments may include a plurality of tubular conduit segments connected by a plurality of fittings, the segments containing and protecting wiring providing current for a plurality of electrical devices from a current source; a conduit body defining a first port connected to a first segment of the plurality of conduit segments and a second port connected to a second segment of the plurality of conduit segments, and a passage between the first port and the second port surrounding a segment of the wiring; an electrical device; a first tubular member supporting the electrical device, the first tubular member connected to a third port on the base; a second tubular member supporting a housing and connected to a fourth port on the base; a circuit contained within a combined enclosure formed by the conduit body, the first tubular member, the second tubular member and the housing, the circuit configured to electrically deliver current to at least the electrical device from the wiring in a first state, the circuit comprising: an engagable electrical isolator located in the housing and configured to allow transfer of current to the lighting assembly from the wiring in a disengaged state corresponding with the first state, and prevent transfer of current to the lighting assembly from the wiring in an engaged state inconsistent with the first state.

Systems may include embodiments wherein the first port has a longitudinal axis coaxial with a longitudinal axis of the second port, wherein the third port has a longitudinal axis orthogonal to a longitudinal axis of the first port and a longitudinal axis of the second port, and/or wherein the fourth port has a longitudinal axis orthogonal to a longitudinal axis of the first port and a longitudinal axis of the second port.

The wiring may provide current for a plurality of electrical devices in parallel. A longitudinal axis of the first segment and a longitudinal axis of the second segment may each be horizontally oriented. The electrical device may be a lighting fixture.

Examples of certain features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1A:
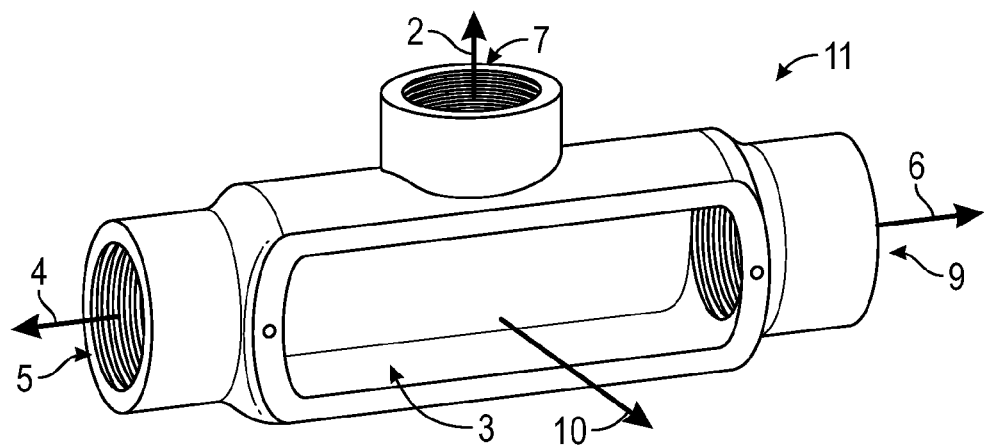
FIGS. 1A & 1B illustrate conduit bodies illustrative of conventional design.

In aspects, the present disclosure relates to devices and methods for providing enhanced access to wiring in electrical conduit systems. In particular, embodiments of the present disclosure facilitate wiring operations electrically linking wiring residing in a horizontal line of conduit to an apparatus vertically displaced from the line of conduit. Illustrative systems according to this disclosure employ techniques that allow access in a beneficial direction of entry to allow wiring personnel (e.g., an electrician) to efficiently carry out the wiring operations, by providing an opening having a direction of entry which is in substantially the same direction as the axis of the ascending port of entry. The teachings may be advantageously applied to a variety of conduit systems in the oil and gas industry, chemical industry, manufacturing, and elsewhere. Merely for clarity, certain non-limiting embodiments will be discussed below.

Exposed wiring is susceptible to environmental hazards, such as moisture and damage from contact. Known electrical conduit systems have a passage interior to the tubular conduit running to desired wiring locations. The electrical conduit system protects the wiring and minimizes dangers from the wiring to people, animals, or equipment.

Traditional electrical conduit systems include standardized components, such as conduit, connectors, junction boxes, couplings, and conduit bodies. A conduit body is an apparatus configured to connect sections of conduit and provide pulling access in a run of conduit as well as at least one of the following: i) redirection of the conduit path, and ii) splitting of the conduit path. Example conduit bodies include T-fittings (or 'tee' fittings), and L-fittings (or 'ell' fittings).

Historically, conduit bodies have a plurality of conduit ports. These conduit ports are configured to receive the wiring of an electrical conduit system and facilitate connection of conduit tubular protecting (e.g., encircling) the wiring. For example, the ports may be configured to receive an end of a conduit tubular segment, a connector used to adapt the conduit tubular to the port, and so on. As one example, both the conduit tubular and the conduit body port may each have complementary threaded surfaces for threaded engagement. A passage between a first port of the plurality of ports and a second port of the plurality of ports allows wiring to pass through the conduit body.

In some instances, a version of the conventional conduit body may be configured to allow access to the passage via an opening (e.g., a hatch) having a direction of entry orthogonal to (and in some cases opposite to) the direction of entry of the conduit ports. European Patent application EP0103414 "Junction pieces for electric conduit" to Gilflex-Key Limited and United Kingdom application GB190623944 "Improvements in Electrical Conduit and Junction Box Fittings" to Hirst et al contain examples illustrative of the prior art.

In conventional use, segments of conduit tubular are typically attached to or otherwise aligned with a length of wall, or a pre-existing longitudinal member such as catwalk, railing, or the like. As one example, the conduit path may run along a catwalk or other structure to provide electricity for raised lighting which may illuminate the catwalk or other structure. In many cases, the conduit path must be installed while accommodating existing structural, architectural, or infrastructure elements. Building, wiring, and health and safety codes, as well as best practices, dictate that electrical conduit components abut these structures. In many cases, the configuration of conventional conduit bodies is not well suited for these applications.

Figure 1B:
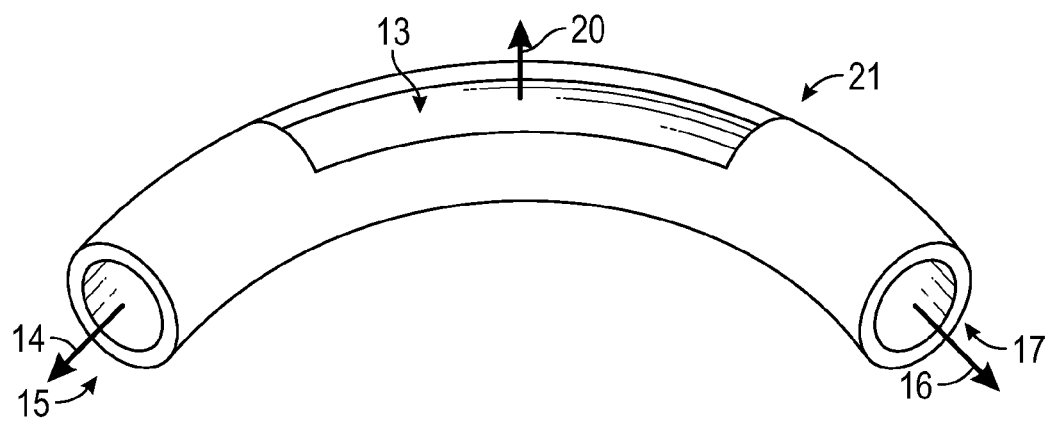

FIGS. 1A & 1B illustrate conduit bodies 11 and 21, respectively, illustrative of conventional design. Referring to FIGS. 1A & 1B, for a conduit body connecting conduit tubular installed in the alignment described above, the direction of entry 2, 4, 6, 14, 16 of each port is aligned with the plane of the wall (or, in the case of the T-fitting, with the longitudinal axis of the longitudinal member), while the direction of entry 10, 20 of the hatch opening 3, 13 (being orthogonal to the directions of entry 2, 4, 6, 14, 16 of the ports) lends itself to enabling access from a person directly facing the hatch opening. That is, personnel facing a conduit body installed directly in front of them will also face the hatch opening "dead-on," or at a substantially zero degree angle. Direction of entry, as used herein, means the vector running from a point interior of the device to the exterior and normal to the opening at its geometric center.

In industrial settings, a conduit system comprising segments of conduit tubular joined by conduit bodies may run horizontally along a wall or catwalk. Often this horizontal conduit path is located remote from chest and eye level of personnel that may be in the setting, e.g., at the bottom end of a wall. Devices to be electrically connected to the horizontal run of conduit (such as, for example, lighting fixtures, machinery, displays, outlets, switches, and the like) are typically located between the bottom and top of a wall, such as, for example, substantially at eye level, shoulder level, or the like for personnel of average height interacting with the device, and are thus remotely located from the horizontal conduit path. T-fittings are often used to split off a horizontal conduit path to form a vertical conduit path for wiring running to the device for electrical connection. Using conventional conduit bodies in a conduit system, wiring operations to connect a device remote from a horizontal lower conduit run may be challenging due to the orientation of the opening and the configuration of the conduit body.

Openings 3, 13 providing access to the interior of the respective conventional conduit body have a direction of entry either orthogonal to or pointing away from the direction from which personnel can most conveniently access (e.g., view) the interior of conduit body in order to perform wiring operations to connect ascending conduit segments stemming off of lower horizontal conduit runs. Thus, the conventional configuration makes accessing the conduit body to perform wiring operations for electrically connecting lower horizontal conduit runs with remote devices awkward and inefficient.

Figure 1C:
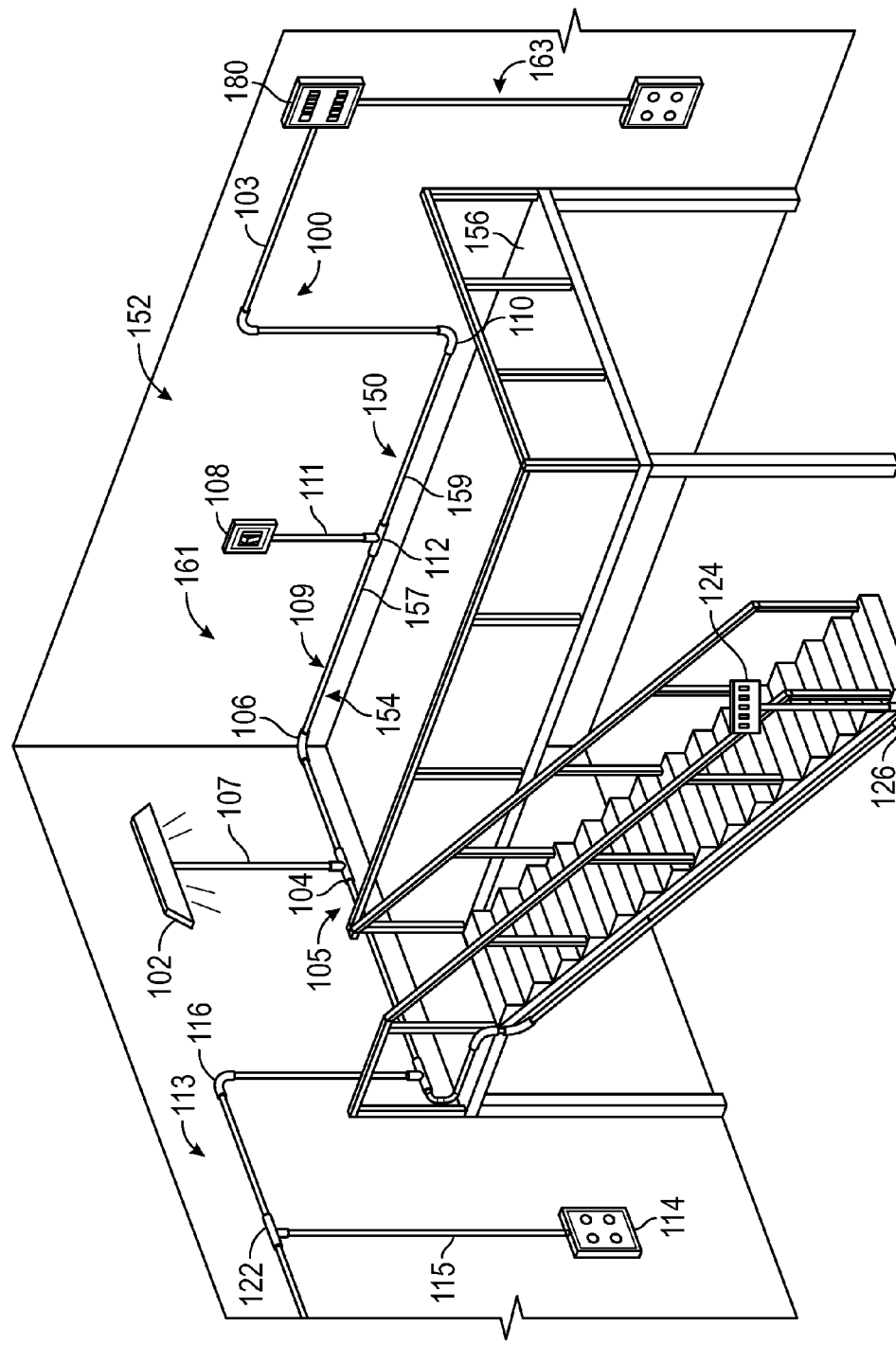
FIG. 1C illustrates an industrial conduit system.

FIG. 1C illustrates an industrial conduit system. Conduit system 100 comprises a number of conduit segments 103 joined by fittings and housing wiring (not shown) connecting electrical devices such as switches, lighting fixtures, junction boxes, and so on. Conduit segments may have industry standard diameters, such as, for example, a diameter of 0.5 inches to 3 inches. L-fitting (or 'ell' fitting) 106 provides a 90 degree horizontal turn to allow the system 100 to follow wall 150 at a corner. L-fitting 110 provides a 90 degree vertical turn to allow the system to run at the upper end 152 of wall 150, for example, in order to avoid railing.

T-fitting 104 allows electrical connection of a light fixture 102 to the horizontal run 105 of conduit via an offshoot conduit segment 107 which extends upward vertically from horizontal run 105 to the fixture 102. Similarly, T-fitting 112 allows electrical connection of a switch 108 to the horizontal run 109 of conduit at the lower end 154 of the wall 150 via an offshoot conduit segment 111 which runs vertically to the switch 108. T-fitting 112 also connects to each of a first conduit segment 157 and a second conduit segment 159 of horizontal run 109. T-fitting 122 allows electrical connection of switch 114 to the horizontal run 113 of conduit at the upper end of the wall via conduit segment 115 extending vertically downward from horizontal run 113. Switch 114 is substantially at eye level (or shoulder level) for personnel on the ground floor, and switch 108 is substantially at eye level for personnel on the upper floor. Junction box 180 distributes mains power to various circuits 161, 163 and provides safety measures such as circuit breakers.

Traditional T-Fittings include a body forming a passage with opposing ports on opposing sides for pass-through wiring and a third port, which is typically orthogonal to a shared axis of the opposing ports, on another side. The body of conventional T-Fittings may have a hatch opposite the third port, on an opposing face. This is often inconvenient, as orienting the third port in the necessary direction places the hatch in an orientation that cannot be easily accessed, particularly when restricted by existing infrastructure.

Aspects of the present disclosure facilitate wiring operations in conduit bodies connected to lower horizontal conduit runs by providing an opening for wiring operations having a direction of entry substantially parallel to the direction of entry of the transverse port.

Figure 2:
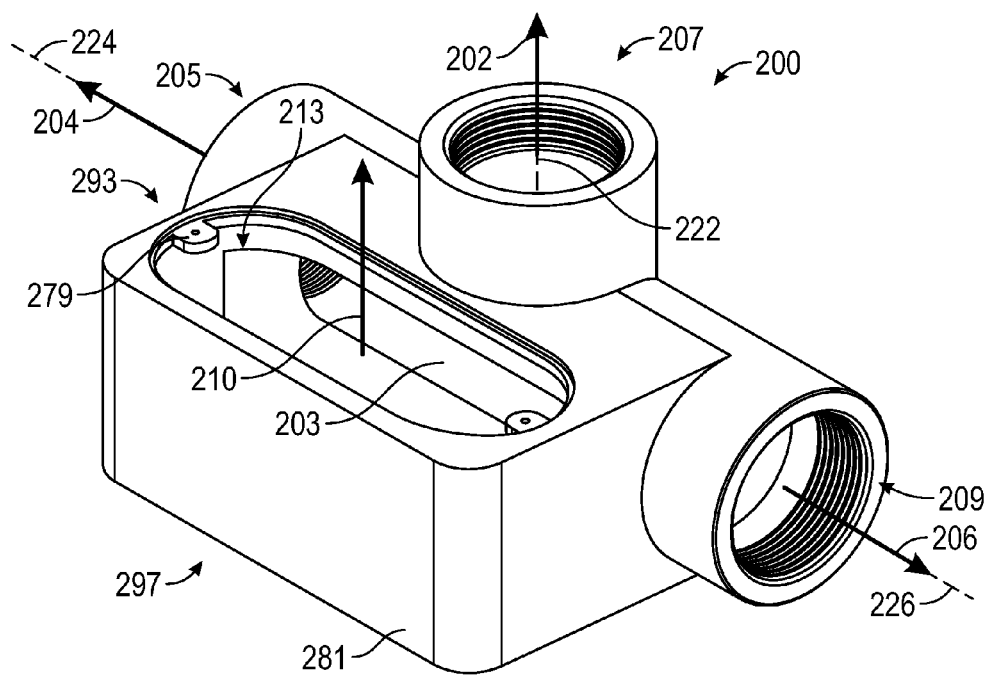
FIG. 2 illustrates a top entry conduit body in accordance with embodiments of the present disclosure.
Figure 3A:
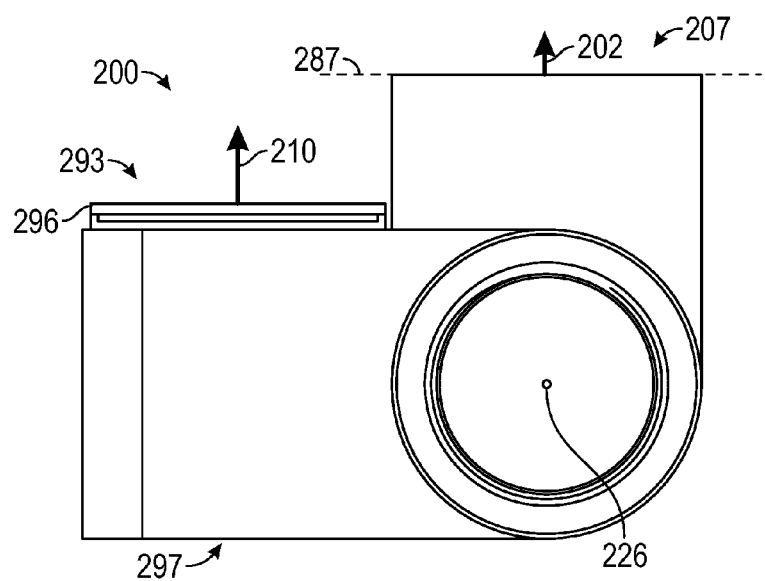
FIGS. 3A & 3B illustrate a top entry conduit body in accordance with embodiments of the present disclosure.
Figure 3B:
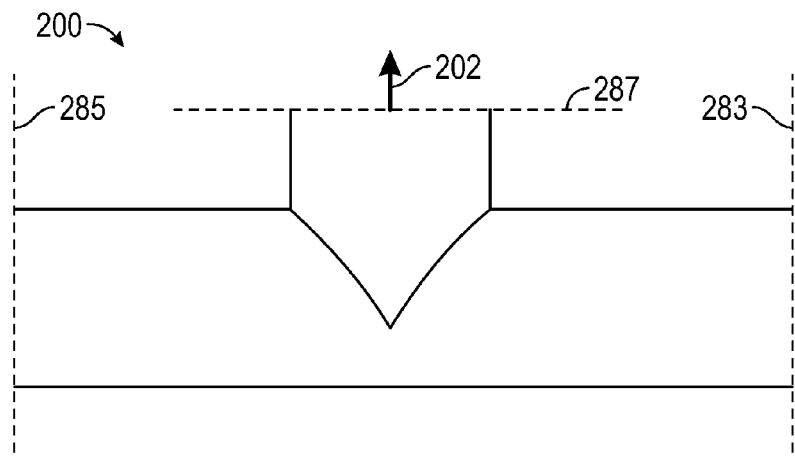

FIGS. 2, 3A & 3B illustrate a top entry conduit body in accordance with embodiments of the present disclosure. The conduit body 200 is configured to connect to two parallel segments of conduit tubular (such as, for example, two segments making up a horizontal run of conduit) as well as a third segment of conduit tubular oriented with a longitudinal axis at 90 degrees from the longitudinal axes of the parallel segments (e.g., the ascending segment). The conduit body 200 defines a plurality of ports 205, 207, 209 each configured to receive a respective end of one of conduit tubular segments, such as, for example, first conduit segment 157 and second conduit segment 159, as shown in FIG. 1C.

The conduit body 200 further defines a passage 203 between the first port 205 and the second port 209 allowing wiring to pass through the conduit body 200. A common cylinder may define surfaces of the first port 205, the second port 209, and the passage 203. The passage 203 also fluidly communicates with additional port 207 which is oriented substantially perpendicular to the passage 203 (e.g., the central axis of the port 207 is substantially perpendicular to the central axis of the passage 203). The plurality of ports 205, 207, 209 each comprise a respective central axis 222, 224, 226 (e.g., a longitudinal axis for a substantially tubular port). The central axes 224, 226 of the respective ports 205 and 209 may be coaxial and may be coaxial with the central axis of the passage 203. The plurality of ports 205, 207, 209 may each comprise a respective plane 285, 287, 289 lying along the perimeter of the respective port, such that plane 287 is perpendicular to each of planes 285 and 289. Planes 285 and 289 may be parallel to one another.

The conduit body 200 further defines a wiring chamber 293 offset from passage 203 and communicating with the passage 203. By "offset," it is meant that the objects or equipment in 293 do not interfere or block free direct passage between ports 205 and 209. The portion of the body surrounding the wiring chamber 293 forms a wiring tray 297 which allows for placement of wiring components during the wiring operation. The wiring chamber may be substantially rectangular, while the passage 203 (and thus, the balance of conduit body 200) may be substantially tubular, or substantially multi-tubular (i.e., formed from intersecting tubular shapes). The wiring chamber may have a flat bottom extending between the front wall 281 and the passage 203, and may be shallow (i.e., having height as the least dimension). In some configurations, the height of the wiring chamber may be less than half of the next least dimension.

The wiring chamber 293 comprises an opening 213 having a direction of entry 210 parallel to direction of entry 202 of additional port 207, and the chamber 293 and opening 213 are configured to enable manipulation of wiring within the chamber 293. The opening 213 may be several times larger (e.g., 2-5 times larger) in at least one dimension than the effective diameter of ports 205, 207, 209. Embodiments may include wiring chamber 293 and opening 213 configured with dimensions sufficient for comfortable entry of a standard sized human hand. The opening may be sealed using a hatch cover 296 suited for this purpose upon the completion of wiring operations. For example, hatch cover 296 may be sealed by threaded engagement of bolts or screws through the hatch cover to tabs 279 spaced around the perimeter of the opening, or to internal or external flanges. Other fasteners, such as locking clips, locking clamps, and so may also be employed, as suitable.

As shown, only the ports 205, 207, 209 provide direct access to the passage 203 and only the opening provides direct access to the wiring chamber. As used herein, "direct access" refers to access to the interior of an enclosure from the exterior while moving through an opening defined by entering an orifice defining the opening in a direction parallel with the axis of the orifice.

The direction of entry 210 of the opening 213 is a first direction substantially transverse to the opening 213 and away from the conduit body 200. The direction of entry 202 of port 207 comprises a second direction substantially transverse to the at least one port 207 and away from the conduit body.

As shown in FIGS. 2, 3A & 3B, in some implementations each respective central axis 222, 224, 226 may substantially lie in a common plane. In particular implementations, wiring chamber 293 is offset and the opening 213 does not intersect the common plane. The wiring chamber 293 may be distinct from (i.e., does not overlap with) passage 203. In some implementations, wiring chamber 293 has at least one dimension (e.g., height, width, depth) greater than the effective diameter of the passage 203. In some embodiments, at least two dimensions of the wiring chamber 293 are greater than the effective diameter of the passage 203. These dimensions may be at least 1.25 times greater than the effective diameter, at least 1.5 times greater than the effective diameter, at least 2 times greater than the effective diameter, at least 2.5 times greater than the effective diameter, and so on, with particular dimensions chosen for the corresponding advantages and weighing disadvantages in accordance with the particular wiring operations to be performed within the wiring chamber 293 and the existing structures or other environmental considerations of the intended installation.

Figure 4:
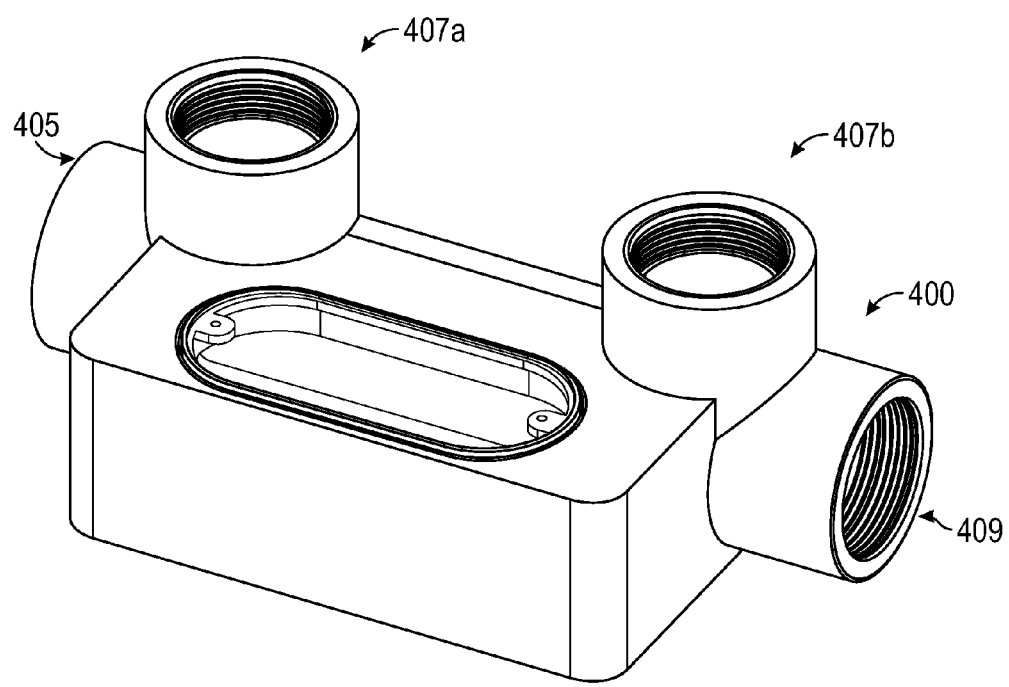
FIG. 4 illustrates another top entry conduit body in accordance with embodiments of the present disclosure.

FIG. 4 illustrates another top entry conduit body in accordance with embodiments of the present disclosure. The conduit body 400 comprises coaxial ports 405 and 409, and two transverse ports: third port 407a and fourth port 407b. Although conduit body 400 is more difficult and costly to manufacture, the pair of transverse ports 407a and 407b allow more complex wiring solutions relating to conduit segments ascending from a horizontal run.

As one example, conduit body 400 may be employed as part of an improved conduit system. The improved conduit system may employ a conduit body having a pair of ports orthogonal to feed-through ports. In this improved system, a first device may be wired using the third port and then wired through to a control mechanism attached to the second port of the pair. In this way, the first device may be controlled locally. In one general embodiment, the first device is provided power via an engagable electrical isolator, which is wired in circuit with the device via the fourth port. The improved system allows easier, safer, and more robust installation and servicing of devices on a main horizontal line housed in a horizontal run of conduit which connects to the feed-through ports.

Figure 5A:
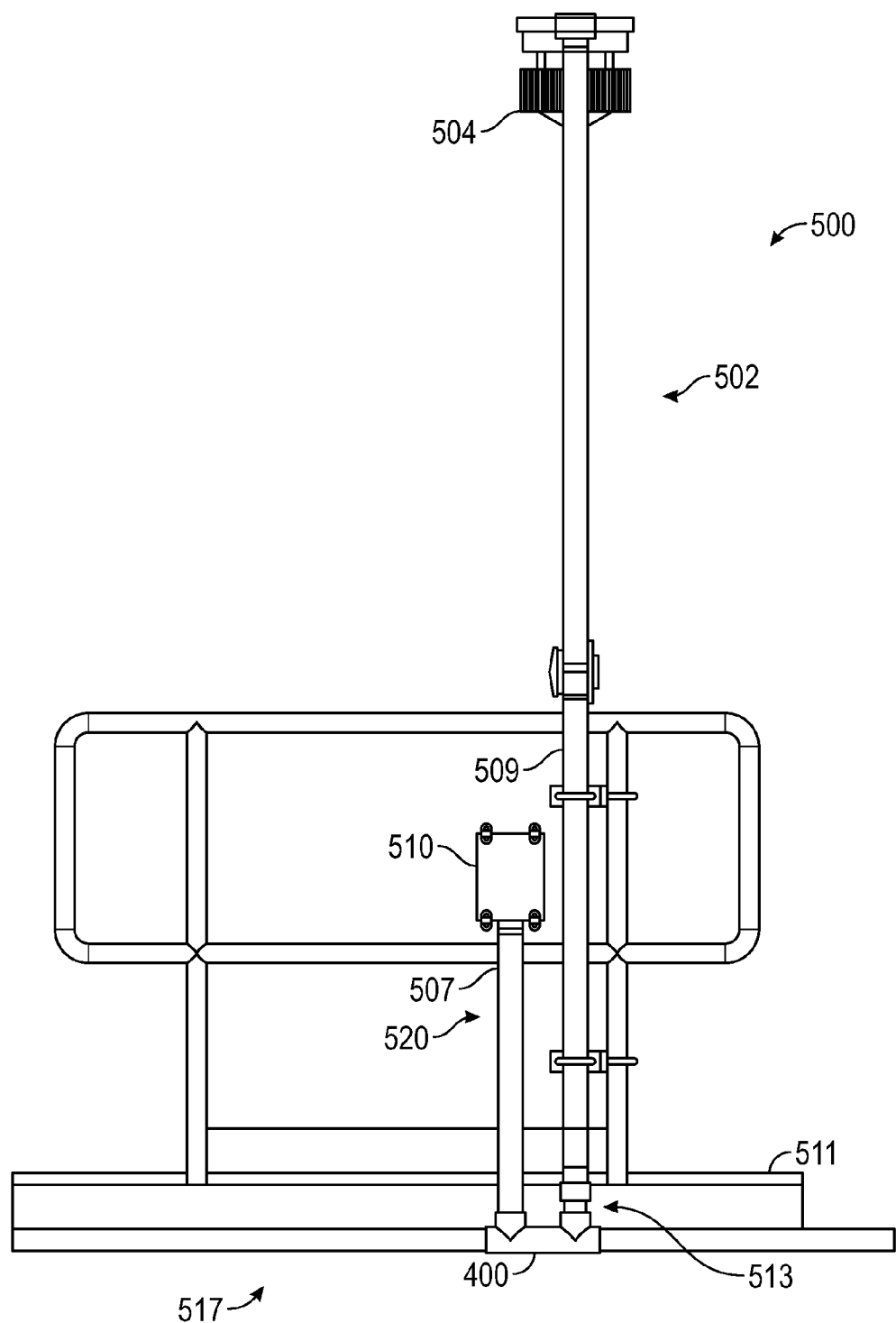
FIGS. 5A-5C illustrate an electrical conduit system including a top entry conduit body employed in an electrical conduit body stanchion in accordance with embodiments of the present disclosure.
Figure 5B:
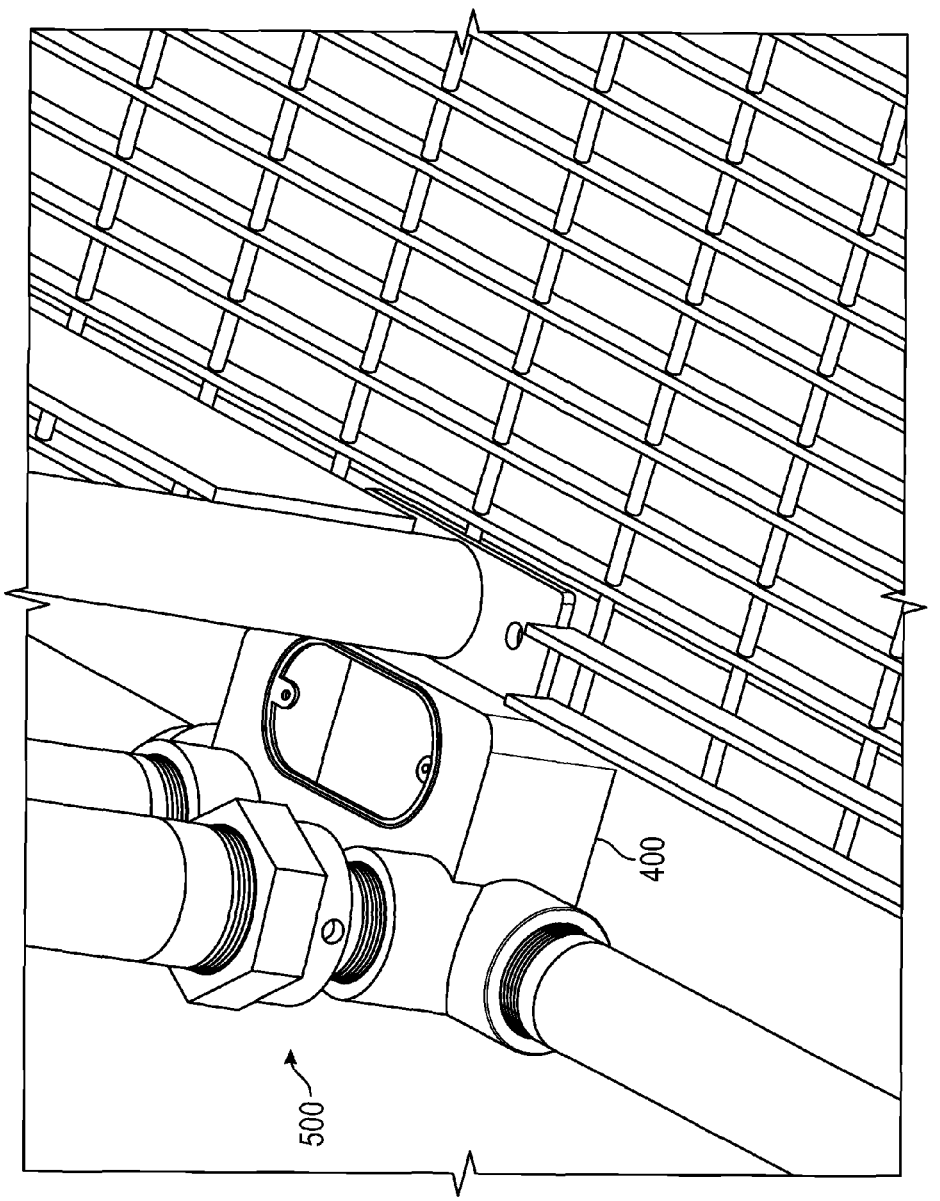
Figure 5C:
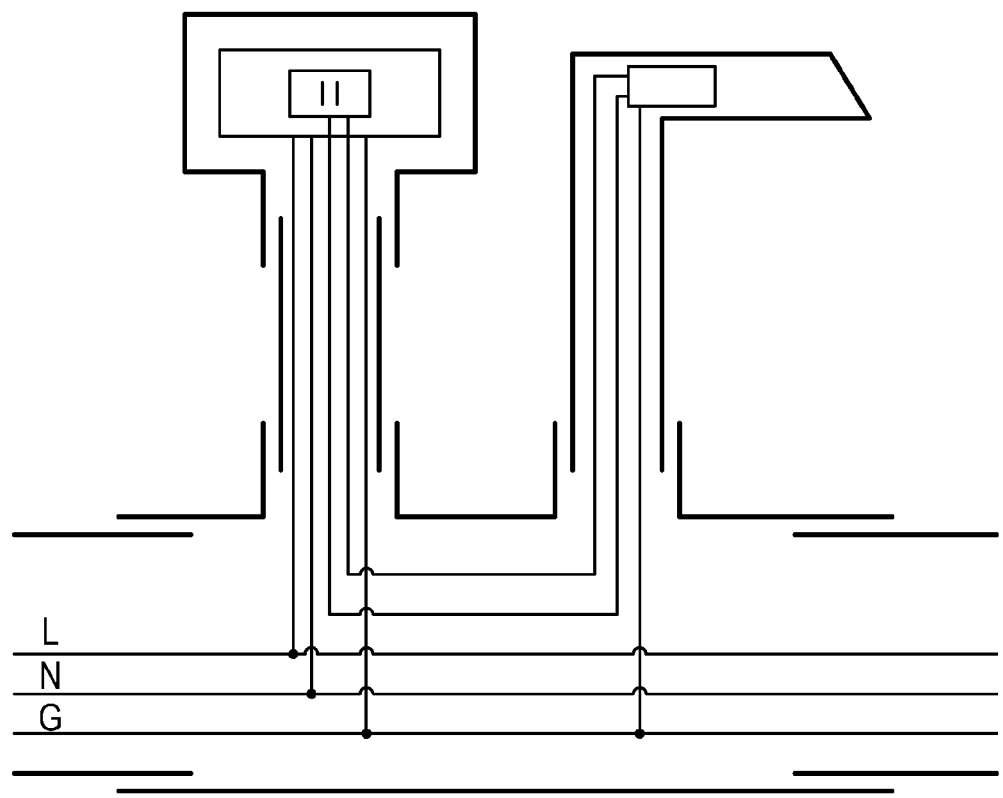

FIGS. 5A-5C illustrate an electrical conduit system including a top entry conduit body employed in an electrical conduit body stanchion in accordance with embodiments of the present disclosure. The system 500 includes a stanchion 520 supported by a catwalk 511. The stanchion 520 includes the top entry conduit body 400; a first tubular member 509 supporting a lighting assembly 502 and connected to the third port 407a of the conduit body 400; and a second tubular member 507 supporting an engagable electrical isolator 510 ('lockout') and connected to the fourth port 407b on the base.

Power for the lighting assembly 502 is provided from a primary electrical line running through horizontal run of conduit 517 running parallel with the catwalk 511 via the electrical isolator 510. The engagable electrical isolator 510 allows power transfer in a disengaged state and prevents power transfer in an engaged state. In this manner installation or wiring operations involving the lighting assembly may be conducted while electrical power is safely disconnected by togging the state of the isolator (e.g., lock-out device), which is proximate to the assembly 502. The disconnection ('locking out') of the lighting assembly 502 allows personnel to safely perform maintenance on the lighting assembly 502 without having to disconnect power to the entire circuit.

The system 500 is mounted on a catwalk 511 by connecting at least one member of the system with a suitable fastener. As shown in FIGS. 5A & 5B, the system is mounted by using a fastener to connect the first tubular member to a railing system of the catwalk 511. In other embodiments, the system may be mounted by connecting the top entry conduit body to the appropriate structure, resting the top entry conduit body on a solid surface, and so on. Thus, in some embodiments, the top entry conduit body may support the lighting assembly via the tubular member. The conduit body may include minor modifications to facilitate mounting in the desired manner.

The stanchion includes support members for a lighting assembly or other elevated electrical device and a switchable electrical isolator ("lockout") device, respectively. The isolator allows power from a general parallel circuit to be locked out for maintenance to the electrical device.

In some aspects, the modified fitting may include an opening offset from the third port and oriented for top entry. For example the opening may be "face-up," e.g., on the top side of the offset portion of the wiring chamber with a perpendicular port having the same direction of entry, particularly with the perpendicular port (for the vertically oriented ascending segment of tubular) vertically oriented with the traditional z axis. One of skill in the art would understand that for a conduit path installed at an elevated level (e.g., along an upper end of a wall, on a ceiling, etc.), the fitting may be inverted so that the opening and the perpendicular port are oriented downward. For convenience, the term "top entry" is used to denote all such designs.

The term "substantially parallel," when used herein in reference to directions of entry, refers to an angle between a direction of entry of a port and a direction of entry of an opening such that full visual access to the opening is enabled from the direction of entry of the port. Directions of entry may be considered substantially parallel in the context of present disclosure, for example, if the angle between them is less than 30 degrees, less than 15 degrees, less than 10 degrees, less than 5 degrees, less than 2 degrees, less than 1 degree, or down to and including a zero degree difference. "Effective diameter" of a surface, as used herein in reference to a passage, port, or a tubular segment, refers to the diameter of a cylinder coinciding with the surface.

The term "body" as used in this disclosure means any enclosure, housing, or any other structure that can at least partially surround equipment. The term "conduit body" as used in this disclosure means any device configured to connect sections of conduit and provide pulling access in a run of conduit as well as at least one of the following: i) redirection of the conduit path, and ii) splitting of the conduit path. Example conduit bodies include T-fittings (or 'tee' fittings), and L-fittings (or 'ell' fittings). The term "dead-on" as used herein means that a line-of-sight or line-of-address is parallel to a direction of entry, or normal to a plane lying on the opening. Opening as used herein means a gap in an exterior surface allowing access. The opening is the smallest imaginary surface defined by a closed three-dimensional curve intersecting the edges of the exterior surface.

While the foregoing disclosure is directed to the one mode embodiments of the disclosure, various modifications will be apparent to those skilled in the art. It is intended that all variations be embraced by the foregoing disclosure.

What is claimed is:

1. A conduit body apparatus for use in an electrical conduit system comprising conduit tubular segments, the apparatus comprising:
   a conduit body defining:
      a plurality of ports each configured to receive an end of a conduit tubular segment;
      a passage between a first port of the plurality of ports and a second port of the plurality of ports allowing wiring to pass through the conduit body; and
      a wiring chamber communicating with the passage, the wiring chamber comprising an opening having a direction of entry substantially parallel to a direction of entry of at least one port of the plurality of ports;
   wherein the plurality of ports each comprises a respective central axis, and wherein each respective central axis substantially lies in a common plane, and the opening does not intersect the common plane.

2. The apparatus of claim 1, wherein the plurality of ports includes an additional port oriented substantially perpendicular to the passage; and
   wherein the direction of entry of the opening is substantially parallel to a direction of entry of the additional port.

3. The apparatus of claim 1, wherein the direction of entry of the opening comprises a first direction substantially transverse to the opening and away from the conduit body, and the direction of entry of the at least one port comprises a second direction substantially transverse to the at least one port and away from the conduit body.

\* \* \* \* \*